United States Patent Office 3,843,414
Patented Oct. 22, 1974

3,843,414
METHOD OF PREPARING NON-AQUEOUS ELECTROLYTE FREE OF ANY TRACE OF FREE ALUMINUM CHLORIDE
Jean-Paul Gabano, Poitiers, and Gerard Lehmann, Liguge, France, assignors to Societe des Accumulateurs Fixes et de Traction (Societe Anonyme), Romainville, France
Original application Mar. 8, 1971, Ser. No. 121,825, now abandoned. Divided and this application May 15, 1973, Ser. No. 360,439
Claims priority, application France, Mar. 27, 1970, 7011097
Int. Cl. H01m 11/00
U.S. Cl. 136—156                              4 Claims

ABSTRACT OF THE DISCLOSURE

Electrochemical cells embodying a lithium negative electrode, a non-aqueous electrolyte of lithium tetrachloroaluminate solution in methylchloroformate, without any trace of free aluminum chloride and a positive electrode comprising a metal chloride ($MeCl_n$) insoluble in methylchloroformate and constituting either a weak acid or a base in the Lewis sense. The electrolyte is prepared by reacting a solution of potassium tetrachloroaluminate in methylchloroformate with lithium perchlorate preferably in slight excess and separating insoluble potassium perchlorate resulting from the reaction. The potassium tetrachloroaluminate itself being prepared by synthesis by heating a mixture of potassium chloride and aluminum chloride at about 300° C. using a slight excess of potassium chloride.

---

This is a division of application Ser. No. 121,825, filed Mar. 8, 1971, now abandoned.

RELATED APPLICATIONS

No related applications are co-pending.

BACKGROUND OF INVENTION

This invention essentially relates to improvements to electrochemical cells with non-aqueous electrolytes.

An electrochemical cell, either primary or secondary, comprises four fundamental constituents: a positive electrode which is reduced during discharge, a negative electrode which is then oxidized, an electrolyte and a separator. When the cell is of the secondary type, the positive electrode is oxidized and the negative electrode reduced during charge.

In this unit, it is absolutely necessary that the various constituents be compatible. It is not possible to associate any one kind of active material with all kinds of electrolyte. Thus, if the active material reacts with the electrolyte, is modified and decomposes the electrolyte, the association of such an active material with such an electrolyte is not practicable. This is, for instance, the case of some high energy active materials such as lithium which is incompatible with aqueous solutions ordinarily used as electrolytes. That is why electrolytes embodying a suitable non-aqueous solvent are used when they are to be associated with an active material such as lithium.

Such a cell comprising a negative lithium electrode and an electrolyte constituted by a suitable solution of lithium tetrachloroaluminate is methylchloroformate has been disclosed in the U.S. Pat. No. 3,540,938. The active material of the electrode disclosed in that patent was constituted by cuprous chloride.

During the tests concerning the behavior of this cell during storage and during discharges at very slow rates, the electrolyte solvent embodying methylchloroformate has been found to decompose, thus evolving gaseous products. Such a behavior firstly was detrimental to the operation of electrodes and further precluded the making of sealed cells.

During this study, two causes of such behavior could be found. On the one hand, the presence of aluminum chloride $AlCl_3$, even as traces, in the electrolyte was found to result in the decomposition of the solvent constituted by methylchloroformate $ClCOOCH_3$. On the other hand, it was also found that the preparation of an electrolyte free from aluminum chloride $AlCl_2$ which constituted a necessary requirement alone was not sufficient to prevent the degradation of the electrolyte solvent which went on through at a lower rate, when cuprous chloride was used as positive active material.

Objects and features of the present invention are to remedy these drawbacks and to obtain quite stable electrochemical cells in which the degradation of the solvent of the electrolyte which comprises a lithium tetrachloroaluminate solution in methylchloroformate is prevented and in which this electrolyte is inactive both towards the active material of the lithium electrode as towards the positive electrode which comprises a metal chloride suitably selected for this purpose.

With the invention, it is more especially possible to provide primary cells operating without any secondary reaction resulting in the decomposition of the electrolyte, which are therefore able to operate without gas evolution during storage and during discharge, even at low-rate discharge, and as a consequence can be enclosed without danger in sealed containers, even if they are cells of very small sizes, which are particularly interesting. It is well known that it is difficult to make sealed cells of very small size since the extent of the secondary reactions resulting in the gas evolution which prevents the sealing of the cells, is proportional to the surface area. This area becomes relatively more important as the cell volume decreases.

SUMMARY OF INVENTION

The present invention relates to electrochemical cells comprising a negative lithium electrode and a non-aqueous electrolyte comprising a lithium tetrachloroaluminate solution in methylchloroformate, such cells being more especially characterized in that the said electrolyte does not contain any trace of free aluminum chloride ($AlCl_3$) and that the positive electrode comprises a metal chloride ($MeCl_n$) insoluble in methylchloroformate ($ClCOOCH_3$) and constituting either a very weak acid or a base of the Lewis type.

The metal chloride satisfying the conditions required for constituting the positive electrode may be selected from the group consisting of silver chloride, mercuric chloride and in a lesser measure cupric chloride.

When the cell embodies these features the electrolyte is found to be quite stable in its conditions of use. More specially it is even possible to make miniature lithum cells of long life and high energy density, e.g. for watches.

According to another characteristic and feature of the invention, in order to effect preparation of an electrolyte comprising a lithium tetrachloroaluminate solution in methylchloroformate which is entirely clear of free aluminum chloride, the lithium tetrachloroaluminate is prepared by double composition, by making lithium perchlorate react with potassium tetrachloroaluminate in substantially stoichiometric ratio, the reaction taking place in a methylchloroformate solution. Thereafter, the insoluble potassium perchlorate produced by the reaction is separated.

Advantageously, a slight excess of lithium perchlorate is used in order to avoid having free potassium tetrachloroaluminate in the final electrolyte.

The potassium tetrachloroaluminate itself can be prepared by synthesis comprising heating a substantially equimolecular mixture of potassium chloride and aluminum chloride at about 300° C. This synthesis is advantageously effected using a slight excess of potassium chloride in order to prevent having free aluminum chloride remaining after the reaction is completed.

Other objects and features of the invention will become apparent from the following detailed description of an embodiment and illustrated in the annexed drawing given solely as example and in which.

DETAILED DESCRIPTION

Figure 1:
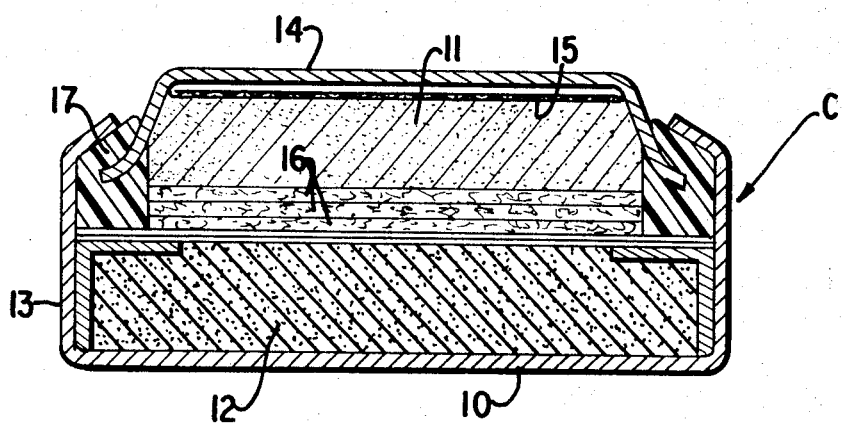
FIG. 1 is a diagrammatic sectional view of a miniature cell embodying the invention.

As hereinabove described, a first purpose of the invention is obtaining a perfectly stable electrolyte comprising methylchloroformate $ClCOOCH_3$ as solvent and lithium tetrachloroaluminate $LiAlCl_4$ as solute, without any free aluminum chloride $AlCl_3$ in the electrolyte.

The best presently known method for preparing the lithium tetrachloroaluminate used as solute, consisted in heating a mixture of aluminum chloride and lithium chloride at temperatures comprising between approximately 300° C. and 450° C. according to the reaction.

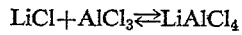

Since it is an equilibrium it is never quantitative and some undesirable free aluminum chloride remains which results in the decomposition of the methylchloroformate used as solvent during use and operation of the cell. The subsequent degradation of the electrolyte yields carbon dioxide and methyl chloride regenerating the aluminum chloride which becomes again available for furthering the decomposition process.

According to the invention another and novel method is used for preparing aluminum tetrachloroaluminate. In this novel method, potassium tetrachloroaluminate ($KAlCl_4$) is first prepared by synthesis comprising heating a substantially equimolecular mixture of potassium chloride $KCl$ and aluminum chloride $AlCl_3$ at approximately 300° C. according to the reaction.

Advantageously, this reaction, which is quantitative, is effected with a slight excess of potassium chloride so that no aluminum chloride remains when the reaction is complete.

Thereafter, the potassium tetrachloroaluminate prepared in this way is reacted with lithium perchlorate in substantially stoichiometric ratio and dissolved in methylchloroformate according to the reaction.

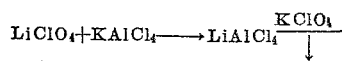

The potassium perchlorate which is quite insoluble in methylchloroformate precipitates and may be separated by merely decanting.

This reaction is advantageously effected with a slight excess of lithium perchlorate which remains in the final electrolyte but does not interfere with or affect the operation of the cell. Thus, the presence of potassium tetrachloroaluminate in the final electrolyte is prevented.

The conversion of potassium tetrachloroaluminate into lithium tetrachloroaluminate is effected with a concentration of lithium perchlorate not over 1 mole per liter since the solubility of lithium perchlorate in methylchloroformate is about this concentration.

As hereabove mentioned, a second feature or characteristic of the invention consists in using a positive active material consisting of a metal chloride which does not react with the solvent of the electrolyte constituted by methylchloroformate and is not substantially dissolved in it.

It has been found that aluminum chloride $AlCl_3$, ferric chloride $FeCl_3$, cadmium chloride $CdCl_2$ and, in a lesser degree, cuprous chloride $CuCl$ are not suitable for constituting a stable positive active material that will not react with the electrolyte solvent. It has also been found that silver chloride $AgCl$ and mercuric chloride $HgCl_2$ do not react with the electrolyte solvent and that cupric chloride $CuCl_2$ causes a decomposition of the said solvent only at a negligible rate.

Some explanations are hereinafter set forth for a better understanding of the complementary aspect of the invention corresponding to its second feature regarding the search for a positive active material that is chemically inactive with respect to the electrolyte solvent.

In a general way the Lewis concept concerning base acids is used for reasoning about the chloride ions $Cl^-$.

A first type of reaction defining an acid compound according to Lewis may be thus represented:

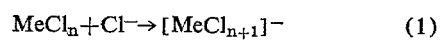

A second type of reaction corresponding to a base according to Lewis may be represented as follows:

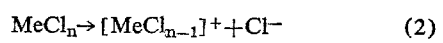

Thus, the solvent constituted by methylchloroformate $ClCOOCH_3$ constitutes a base in the Lewis sense since it can form the ion $CH_3COO^+$ and the ion $Cl^-$ when the latter can be fixed by an acceptor of chloride ions $Cl^-$ which acids in the Lewis sense can do.

It has been found in the researches made for developing the present invention that a positive active material made of a metal chloride must meet two requirements:

The first requirement is to be practically insoluble in the solvent. Thus, a chloride soluble in the solvent degrades the solvent by a series of secondary reactions. That is, for instance, the case for aluminum chloride $AlCl_3$ whose catalytic action in effecting the decomposition of the solvent has been mentioned hereinabove.

The second requirement relates to the kind of the metal chloride in the general sense of Lewis. Thus, the more marked the acid character in the Lewis sense of the chloride in question is, the higher is the rate of solvent attack. Such is the case of aluminum chloride $AlCl_3$. Ferric chloride $FeCl_3$ attacks the solvent at a slower rate than aluminum chloride $AlCl_3$ and it is a less strong acid in the Lewis sense. Thus, cadmium chloride $CdCl_2$ which is still weaker an acid in the Lewis sense causes an attack at a slower rate than that of ferric chloride. This rate is very slow for cuprous chloride which has a not very marked acid character according to Lewis, and it is cancelled for silver chloride which has a very weak Lewis acid character.

This is the reason why silver chloride is within the scope of this invention.

It is easy to understand also the reason why the positive active materials constituted by mercuric chloride and also by cupric chloride are part of the present invention due to the fact that the action of the former on the electrolyte solvent constituted by methylchloroformate is null whereas it is practically negligible for the latter. These compounds are bases in the Lewis sense.

Sealed miniature cells which may, for instance, be used in watches have been made according to the invention.

As shown in FIG. 1, the cell C is of the so-called button type comprising a cup-like casing bottom 10 and a casing cover 11, both made of stamped nickel plated steel sheet.

Cathode 12 is composed of a mixture of 95% silver chloride (AgCl) and 5% graphite (or any other material conferring a good electrical conductivity to the electrode). This mixture is directly compressed into the cup-like bottom 10 and held in place as by ring 13 e.g. made of stamped steel.

Anode 11 is a lithium disk. A nickel plated steel or stainless steel grid or screen 15 is welded to cover 14 of the cell and is also embedded in the lithium disk 11. This, ensures both good cohesion and good electrical contact with the cover 14.

A separator 16 comprised of one of several layers of a felt of cellulosic fibers is interposed between the electrodes 11 and 12. This separator 16 is impregnated with the electrolyte comprising a solution of lithium tetrachloroaluminate in methylchloroformate having no traces of free aluminum chloride and prepared according to the invention as hereinabove described.

An electrical insulating gasket 17 seals the closure between casing bottom 10 and cover 11 and insulates these two parts from each other. These parts 10 and 11 respectively constitute the electrical terminals of the cell.

Cells have been made with the following features:

cathode 12: AgCl 95% + graphite 5% : 800 mg; theoretical capacity 142 mah.
anode 11: lithium disk 2 mm. thick with an embedded stainless steel grid 15 welded to the negative cover 14
electrolyte: $ClCOOCH_3 + 1$ M $LiAlCl_4 + 0.1$ M $LiClO_4$ quantity per cell about 0.15 $cm_3$.
Total volume of the cell C: 0.52 $cm_3$
Total weight: 1.95 g.
Outer diameter: 11.5 m.
Height: 5 mm.

The electrical characteristics of such a cell were as follows:

open circuit voltage: 3.08 volts.
internal resistance: 150Ω (decreases to about 50Ω after a slight discharge).
average voltage during discharge: 2.60 volts (with a 8980Ω lead).
capacity: end voltage 2 v.: 126 mah.
end voltage 2.4 v.: 116 mah.
energy: 325 mwh for a 2 v. end voltage
energy per unit of volume: 620 wh./$dm_3$.
energy per unit of weight: 165 wh./kg.

Figure 2:
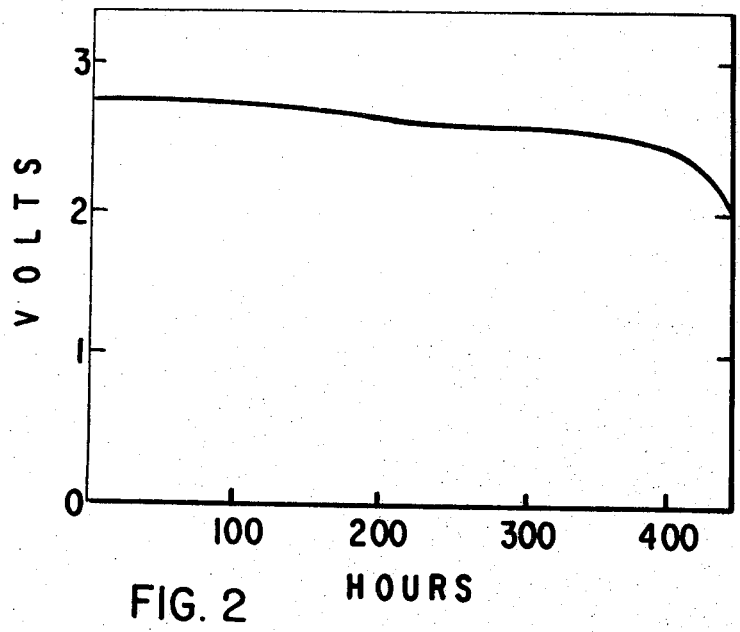
FIG. 2 is a curve showing the voltage of a cell in volts as ordinates plotted against the time of discharge in hours as abscissae.

The curve of FIG. 2 shows the cell discharge into a 8980Ω load corresponding to an average output current of 0.3ma./$cm_2$. The curve is substantially flat for approximately 400 hours and only slightly inclined to the horizontal over this period of time.

While specific embodiment of the invention have been described and shown, variations within the scope of the appended claims are possible and are contemplated. There is no intention, therefore, of limitation to the exact disclosure herein presented.

What is claimed is:

1. A method for preparing an electrolyte for use in electrochemical cells having a lithium base negative electrode and a metal chloride positive electrode which is insoluble in methylchloroformate comprising the steps of effecting a reaction by heating of a substantially equi-molecular mixture of potassium chloride and aluminum chloride at about 300° C. to produce potassium tetrachloroaluminate as reaction product, utilizing a slight excess of potassium chloride in said mixture to prevent presence of any free aluminum chloride in said reaction product, effecting a solution of said potassium tetrachloroaluminate reaction product in methylchloroformate and reacting said solution in substantially stoichiometric ratio with lithium perchlorate to yield lithium tetrachloroaluminate dissolved in said methylchloroformate together with potassium perchlorate which is insoluble in said methylchloroformate and decanting said potassium perchlorate to provide as an end product said electrolyte of lithium tetrachloroaluminate dissolved in methylchloroformate and free of any trace of free aluminum chloride.

2. A method for preparing an electrolyte for use in electrochemical cells having a lithium negative electrode and a metal chloride positive electrode comprising reacting a solution of potassium tetrachloroaluminate in methylchloroformate with lithium perchlorate in substantially stoichiometric ratio to precipitate insoluble potassium perchlorate and thereafter separating said insoluble potassium perchlorate precipitate produced by the reaction.

3. A method for preparing an electrolyte according to claim 2 wherein said potassium tetrachloroaluminate is prepared by synthesis comprising heating a substantially equi-molecular mixture of potassium chloride and aluminum chloride at approximately 300° C., said synthesis being effected with use of a slight excess of potassium chloride.

4. A method for preparing an electrolyte according to claim 2, wherein a slight excess of lithium perchlorate is used in precipitating the potassium perchlorate.

References Cited
UNITED STATES PATENTS

| | | | |
|---|---|---|---|
| 3,073,884 | 1/1963 | Pinkerton | 136—100 |
| 3,540,938 | 11/1970 | Gabano | 136—155 |
| 3,542,602 | 11/1970 | Gabano | 136—166 |

ANTHONY SKAPARS, Primary Examiner

U.S. Cl. X.R.
136—155